(12) United States Patent
Kim et al.

(10) Patent No.: US 10,133,659 B2
(45) Date of Patent: Nov. 20, 2018

(54) PROACTIVE MEMORY ALLOCATION

(71) Applicants: Hyeong Seog Kim, Seoul (KR); Jaeyun Noh, Seoul (KR); Yong Sik Kwon, Seoul (KR); Sang Kyun Cha, Seoul (KR)

(72) Inventors: Hyeong Seog Kim, Seoul (KR); Jaeyun Noh, Seoul (KR); Yong Sik Kwon, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 14/253,634

(22) Filed: Apr. 15, 2014

(65) Prior Publication Data
US 2015/0149514 A1 May 28, 2015

Related U.S. Application Data

(60) Provisional application No. 61/907,641, filed on Nov. 22, 2013.

(51) Int. Cl.
| | |
|---|---|
| *G06F 17/00* | (2006.01) |
| *G06F 12/02* | (2006.01) |
| *G06F 17/30* | (2006.01) |
| *G06F 9/50* | (2006.01) |
| *G06F 12/08* | (2016.01) |

(52) U.S. Cl.
CPC .......... *G06F 12/023* (2013.01); *G06F 9/5016* (2013.01); *G06F 17/30339* (2013.01); *G06F 12/08* (2013.01); *G06F 2209/5011* (2013.01)

(58) Field of Classification Search
CPC .................................................... G06F 12/023
USPC .......................................................... 707/736
See application file for complete search history.

(56) References Cited

U.S. PATENT DOCUMENTS

| | | | | |
|---|---|---|---|---|
| 5,687,361 | A * | 11/1997 | Sarkar | G06F 17/30949 |
| 6,115,705 | A * | 9/2000 | Larson | G06F 17/30489 |
| 7,469,329 | B2 * | 12/2008 | Kuczynski | G06F 17/30312 |
| | | | | 707/999.101 |
| 8,352,517 | B2 * | 1/2013 | Park | G06F 17/30471 |
| | | | | 707/708 |
| 9,003,162 | B2 * | 4/2015 | Lomet | G06F 12/10 |
| | | | | 707/999.2 |

(Continued)

OTHER PUBLICATIONS

Wikipedia, "Thread (computing)," <http://en.wikipedia.org/wiki/Thread_(computing)>, 8 pages (accessed Apr. 15, 2014).

(Continued)

*Primary Examiner* — Eliyah S. Harper
(74) *Attorney, Agent, or Firm* — Klarquist Sparkman, LLP

(57) ABSTRACT

Technologies are described for performing proactive memory allocation (e.g., pre-allocation). Proactive memory allocation (e.g., proactive memory page allocation) can be provided for applications, such as database applications. For example, an application can be associated with a free memory pool (e.g., a free memory pool containing free memory pages). A dedicated thread of the application can monitor the free memory pool and perform proactive memory allocation when needed (e.g., when the amount of memory in the pool is low). For example, the dedicated thread can obtain new free memory from the operating system and add it to the pool.

11 Claims, 7 Drawing Sheets

(56) References Cited

U.S. PATENT DOCUMENTS

| | | | | |
|---|---|---|---|---|
| 9,519,591 B2* | 12/2016 | Lomet | ............... | G06F 12/0891 |
| 2004/0064642 A1* | 4/2004 | Roskind | ............ | G06F 17/30902 |
| | | | | 711/118 |
| 2006/0074872 A1* | 4/2006 | Gordon | ............... | G06F 17/3048 |
| 2007/0100916 A1* | 5/2007 | Konecny | ............... | G06F 9/5016 |
| 2007/0204117 A1* | 8/2007 | Van Riel | ............... | G06F 12/023 |
| | | | | 711/159 |
| 2010/0110495 A1* | 5/2010 | Letocha | ............... | G06F 3/1215 |
| | | | | 358/1.17 |
| 2013/0080481 A1* | 3/2013 | Zhou | ................. | G06F 17/3033 |
| | | | | 707/803 |
| 2013/0159285 A1* | 6/2013 | Dees | ............... | G06F 17/30466 |
| | | | | 707/718 |

OTHER PUBLICATIONS

Chaim Bendelac, "SAP HANA Memory Usage Explained," SAP white paper, <http://www.saphana.com/docs/DOC-2299>, 12 pages (Dec. 2013).

* cited by examiner

PROACTIVE MEMORY ALLOCATION

BACKGROUND

Management of memory in computing systems, such as in-memory database systems, can be difficult. For example, if free memory is low, a process may have to wait until additional memory can be allocated before processing can continue. This can cause performance bottlenecks within the system.

Therefore, there exists ample opportunity for improvement in technologies related to memory management within computing environments, such as database environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for performing proactive memory allocation (e.g., pre-allocation). Proactive memory allocation (e.g., proactive memory page allocation) can be provided for software applications, such as database applications. For example, an application can be associated with a free memory pool (e.g., a free memory pool containing free memory pages). A dedicated thread of the application can monitor the free memory pool and perform proactive memory allocation when needed (e.g., when the amount of memory in the pool is low). For example, the dedicated thread can obtain new free memory from the operating system and add it to the pool. Other processes and/or threads can also monitor the amount of free memory (e.g., instead of, or in addition to, a dedicated thread) and participate in proactive memory allocation (e.g., by notifying a dedicated thread to add additional memory to the pool).

As described herein, a variety of other features and advantages can be incorporated into the technologies as desired.

DETAILED DESCRIPTION

Example 1—Overview

Figure 1:
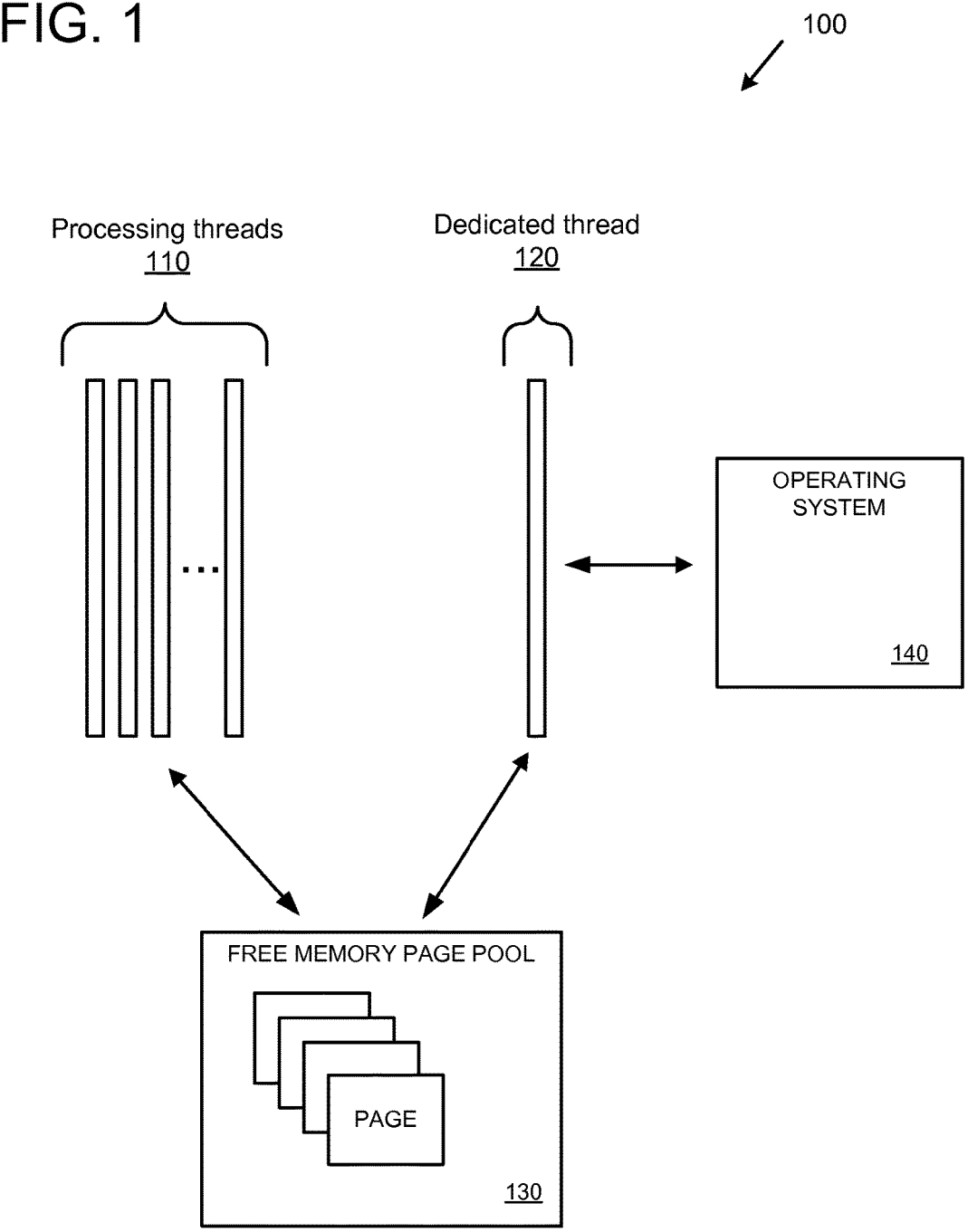
FIG. 1 is a diagram of an example environment supporting proactive memory page allocation.

The following description is directed to techniques and solutions for proactive memory allocation (pre-allocation). Proactive memory page allocation can be performed to pre-allocate free memory for an application to use when needed (e.g., for use at runtime of the application by processes and/or threads). For example, the techniques and solutions can be used to perform proactive memory page allocation for an application, such as a database application (e.g., to provide memory pages for insertion intensive workloads in a database).

In an in-memory database management system, such as the HANA database (HANA is a database platform provided by SAP®), data is resident in memory. In some implementations, all data is resident in memory. In other implementations, only a portion of the data is resident in memory (e.g., frequently used and/or important data). Allocating memory in the database can be a time-consuming process particularly when the memory allocation involves interaction with the persistency layer (e.g., to allocate corresponding storage) that involves disk input/output (I/O) with storage volumes. In some implementations, until the new memory page allocation process finishes, any threads that need a new page of memory to store data are blocked, which results in slow response to database clients.

Performance of memory page allocation can be particularly important during insertion intensive workloads (e.g., insertion intensive workloads interacting with a row store within a database application). For example, when a large amount of data is to be stored in memory (e.g., when a large amount of data and/or a large number of transactions are being performed to insert data into database tables), a large number of free memory pages are needed. If a sufficient pool of free memory pages are not available (e.g., in a free memory page pool that stores free memory pages associated with the application), then performance and responsiveness of the application can suffer (e.g., while waiting for new memory pages to be allocated from the operating system).

In some implementations, memory pages are allocated in advance by a dedicated thread (or multiple dedicated threads) of a running application so that other threads (e.g., user-request-serving threads) don't have to suffer from the time-consuming memory page allocation process. The existing memory management technique provided by the operating system can be exploited for this purpose. During runtime, the dedicated thread runs to monitor the current status of the free memory page pool (e.g., a pool of free memory pages that are associated with the application but that are not currently used by the application to store data). The monitoring can also be conducted by other threads (e.g., the user-request-serving threads) in addition to, or instead of, by the dedicated thread. If the number of free memory pages is too small to meet the memory needs of the application (e.g., if a low free memory condition exists), then proactive memory page allocation can be triggered to allocate new free memory pages and add them to the free memory page pool (e.g., until the number of free pages is regarded as enough to accommodate future workload). The other threads of the application use the pages from the free memory page pool to store data. In this way, the other threads of the application (other than the one or more dedicated threads) can be free from memory page allocation overhead and performance of the application can be improved.

In some implementations, pages are allocated in advance by a dedicated thread (or multiple dedicated threads) so that the user-request-serving threads don't have to suffer from the time-consuming memory page allocation process. The existing memory management technique is exploited for this purpose. During runtime, a thread runs to monitor the current status of the free memory page pool (or the monitoring can be conducted by user-request-serving threads). If the number of free memory pages is too small to serve the incoming data insertion workload (e.g., below a threshold value), it triggers page pre-allocation and makes new sets of free pages until the number of free pages is regarded as enough to accommodate the incoming data workload (e.g., until the number of free pages reaches a threshold value). User-request-serving threads retrieve pages from the set of free pages and use them to store the incoming data. Thus, the user-request-serving threads are free from page allocation overhead. In this manner, the response time is sustained and the possibility of response time fluctuation becomes very low.

Example 2—Environment for Proactive Memory Allocation

In any of the examples herein, an environment can be provided for performing proactive memory allocation. For example, the environment can be a database environment that is running on one or more computer servers.

FIG. 1 is a diagram depicting an example environment 100 supporting proactive memory page allocation to pre-allocate free memory. In the example environment 100, an application (e.g., running as a process on a computing device) is implemented by one or more processing threads 110 (e.g., one or more threads of execution). For example, the processing threads 110 can execute the computer instructions that implement the application (e.g., a database application or another type of application).

In the example environment 100, a dedicated thread 120 (e.g., another thread of execution) is running within the application (e.g., within the same process as the processing threads 110). The dedicated thread 120 is separate from, and independent of, the processing threads 110.

In the example environment 100, the application uses memory (also called primary memory, primary storage, or random-access memory (RAM)) to store and process data. When the application needs additional memory, the application obtains the memory from a free memory page pool 130 that is associated with the application. For example, the free memory page pool 130 can contain a number of free memory pages that have not yet been used by the application for storing data but have already been obtained from the operating system 140 and associated with the application. Similarly, the free memory page pool 130 can contain free memory pages that were previously used by the application (but are not currently being used to store data), but that remain associated with the application for future use by the application instead of being returned to the operating system 140.

The dedicated thread 120 is dedicated to performing proactive memory page allocation. The dedicated thread 120 can perform proactive memory page allocation by monitoring the free memory page pool 130. For example, the dedicated thread 120 can monitor the free memory page pool 130 to determine whether there are enough free memory pages available for the application to use (e.g., to handle expected future workload or to satisfy a minimum free memory page threshold). In some implementations, multiple dedicated threads are present that are dedicated to performing proactive memory page allocation.

In some implementations, the dedicated thread 120 monitors the free memory page pool 130 by checking the number of free memory pages available within the free memory page pool 130. If the number of free memory pages available within the free memory page pool 130 indicates a low free memory condition, then the dedicated thread 120 can proactively add more free pages to the pool 130. Whether there is a low free memory condition (e.g., a low free memory page condition) can be determined, for example, by comparing the amount of free memory in the free memory page pool 130 (e.g., the number of free memory pages in the pool 130) to a threshold value. The low free memory condition can also be determined based on other criteria (e.g., based on a percentage of free vs. utilized memory, based on an amount of memory expected to be needed for upcoming transaction workloads, and/or based on other criteria).

When the dedicated thread 120 determines that additional memory pages need to be added to the free memory page pool 130 (e.g., based on a low free memory condition), the dedicated thread 120 can allocate new free memory pages by obtaining the new free memory pages from the operating system 140. The dedicated thread 120 can then add the allocated new free memory pages to the free memory page pool 130.

The dedicated thread 120 can obtain memory from the operating system 140 in units of a memory page (e.g., a 16 KB memory page or a memory page of a different size) or in different units. In some implementations, the dedicated thread 120 obtains a memory segment (e.g., a shared memory segment) from the operating system 140 that is larger than a memory page. As an example, the memory segment may be 64 MB. In situations where the dedicated thread 120 obtains memory in a larger portion than a memory page (e.g., in segments), the dedicated thread 120 can divide the larger portion into smaller portions for adding to the free memory page pool 130. For example, if the dedicated thread 120 obtains a new free memory segment of 64 MB from the operating system 140, then the dedicated thread can divide the new free memory segment into 4,096 new free memory pages, each 16 KB in size, and add the 4,096 new free memory pages to the free memory page pool 130.

Performing proactive memory allocation can provide advantages. For example, application responsiveness can be improved by maintaining a pool of free memory pages associated with the application (e.g., with the application process) that have already been allocated in advance (e.g., pre-allocated) from the operating system. Maintaining pre-allocated free memory pages can reduce or eliminate the time otherwise needed for a process or thread to request new memory pages from the operating system.

Using a thread of execution that is dedicated to performing proactive memory allocation (e.g., dedicated thread 120) can also provide advantages. For example, in an application being executed as a process on a computing device, a number of threads of execution may be running (e.g., concurrently in a multi-core system). Delays can occur when a thread that is performing application-related operations (e.g., responding to user requests, processing data, etc.), such as one of the processing threads 110, has to wait for memory allocation to be performed (e.g., by obtaining additional free memory from the operating system 140). A thread dedicated to performing proactive memory allocation (e.g., dedicated thread 120) can allocate free memory (e.g., free memory pages) in advance of it being needed by the other threads (e.g., processing threads 110) so that the other threads can obtain free memory quickly and efficiently when needed (e.g., from the free memory page pool 130) without having to allocate the free memory from the operating system 140 and possibly incur additional delays.

Performing proactive memory allocation can also provide advantages when memory allocation involves persistent storage. For example, in some situations memory is allocated along with persistent storage (secondary storage, such as disk volume storage using hard disk drives (HDDs) or solid-state drives (SSDs)), which can be used to persistently store data for use during restarts or recovery. Allocating persistent storage can take much longer than allocating primary memory, and can thus significantly delay memory allocation (e.g., a thread may have to suspend processing and wait for primary memory and associated secondary storage to be allocated). By proactively allocating free memory (which may be associated with secondary storage) and storing it in a pool, processes and/or threads can utilize the pre-allocated memory from the pool without having to incur the delay of obtaining the free memory from the operating system.

In a particular implementation, the example environment 100 represents an in-memory database environment with the processing threads 110 performing database-related operations implementing the in-memory database and the dedicated thread 120 performing proactive memory page allocation to create free memory pages for in-memory database storage. In an example implementation, the in-memory database can store data using, at least in part, row-based in-memory storage (e.g., as a row store that stores database table information organized by rows). For example, the dedicated thread 120 can allocate memory segments from the operating system 140, divide the memory segments into free memory pages, and add the free memory pages to the free memory page pool 130. When the processing threads 110 need additional memory (e.g., when performing database-related operations), the processing threads 110 can obtain free memory pages from the free memory page pool 130 (e.g., instead of having to allocate the free memory pages from the operating system 140, which can cause delays, particularly if persistent storage is allocated along with the free memory pages). The processing threads 110 can perform database-related operations comprising insertion operations (e.g., for inserting data to the row store), update operations (e.g., for updating data within the row store), and delete operations (e.g., for deleting data from the row store).

Figure 2:
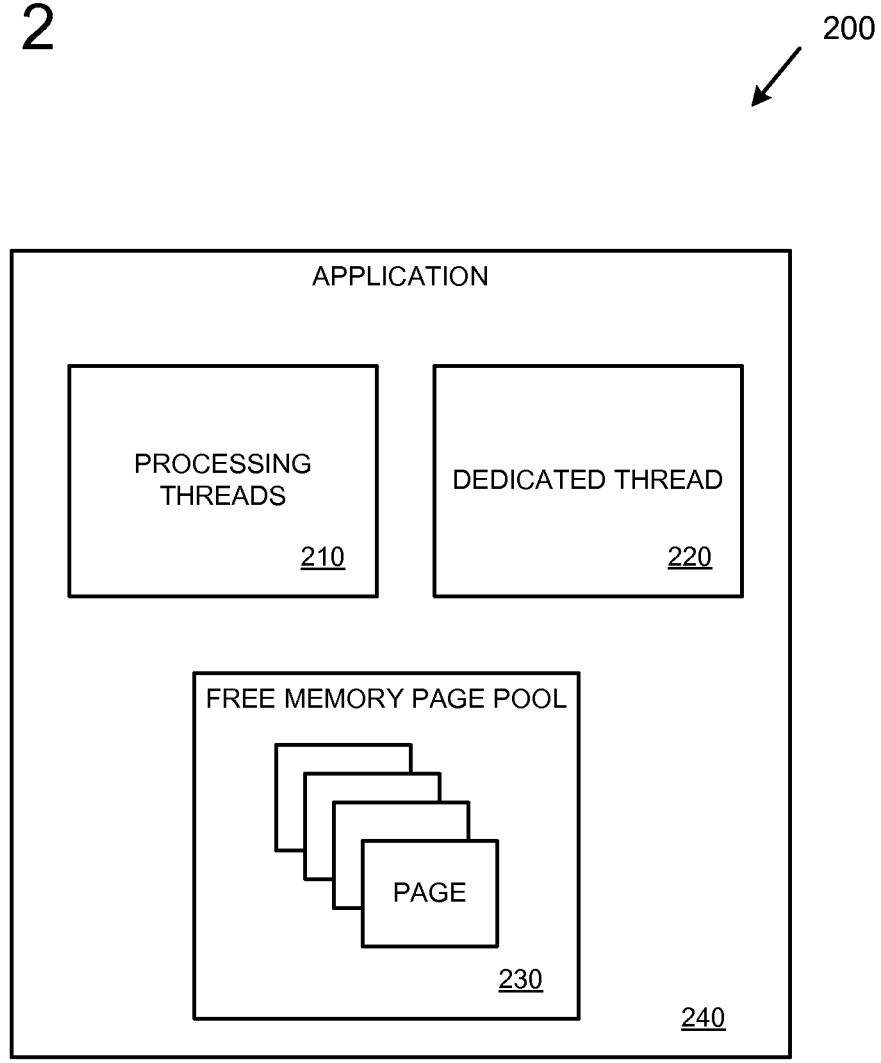
FIG. 2 is a diagram of an example environment supporting proactive memory page allocation within an application.

FIG. 2 is a diagram depicting an example environment 200 supporting proactive memory page allocation within an application 240. For example, the application 240 can be a database application or another type of application running on a computing device (e.g., a computer server). The application 240 can be implemented as a computer process executing an instance of the application on the computing device.

The application 240 is associated with a free memory page pool 230. The free memory page pool 230 contains free memory pages that have been proactively allocated (e.g., pre-allocated) for use by the application. The free memory pages in the free memory page pool 230 can be free memory pages that are associated exclusively with the application 240 and/or shared free memory pages that are associated with multiple applications and/or processes.

The application 240 is implemented, at runtime, by processing threads 210 (e.g., one or more threads of execution). The processing threads 210 use memory to store data, or for other purposes, during execution of the application 240. The processing threads 210 obtain free memory pages from the free memory page pool 230.

A dedicated thread 220 (e.g., a thread of execution within the application 240 that is separate and independent of the processing threads 210) can monitor the free memory page pool 230. For example, the dedicated thread 220 can monitor the free memory page pool 230 on a periodic basis (e.g., every few milliseconds or seconds) to determine whether there are enough free memory pages available in the pool 230. If the dedicated thread 220 determines that there are not enough free memory pages in the pool 230 (e.g., that a low free memory condition exists), the dedicated thread 220 can allocate new free memory pages (e.g., via an operating system call) and add them to the pool 230.

In some implementations, the processing threads 210 also participate in proactive memory page allocation. For example, when a processing thread is performing normal operations for the application 240, the processing thread can also check the free memory page pool 230 to determine whether there are enough free memory pages available. If there are not enough free memory pages (e.g., a low free memory condition exists), then the processing thread can call the dedicated thread 220 to allocate and add new free pages and/or the processing thread can allocate and add new pages itself. In this manner, the processing threads 210 can check the free memory page pool 230 while they are already running and performing other work, which can be beneficial in catching a low free memory condition that occurs in between monitoring cycles of the dedicated thread 220. For example, if there is a situation where free memory pages are being used rapidly (e.g., in a database application, when a large amount of data is being inserted into tables), the number of free memory pages in the pool 230 can drop quickly and may run out before the next time the dedicated thread 220 is scheduled to check. Processing threads 210, which are already executing for some other reason (e.g., in the database application, performing insert, delete, and/or update operations), can assist with checking the number of free memory pages and either perform proactive memory page allocation or instruct the dedicated thread 220 to perform proactive memory page allocation.

Example 3—Methods for Proactive Memory Allocation

In any of the examples herein, methods can be provided for proactively allocating (e.g., pre-allocating) memory. For example, the methods can be used to proactively allocate memory within an application, such as a database application or another type of application. Memory can be proactively allocated by a process and/or a thread executing within the process (e.g., by a thread that is dedicated to performing proactive memory allocation and/or by other threads).

Figure 3:
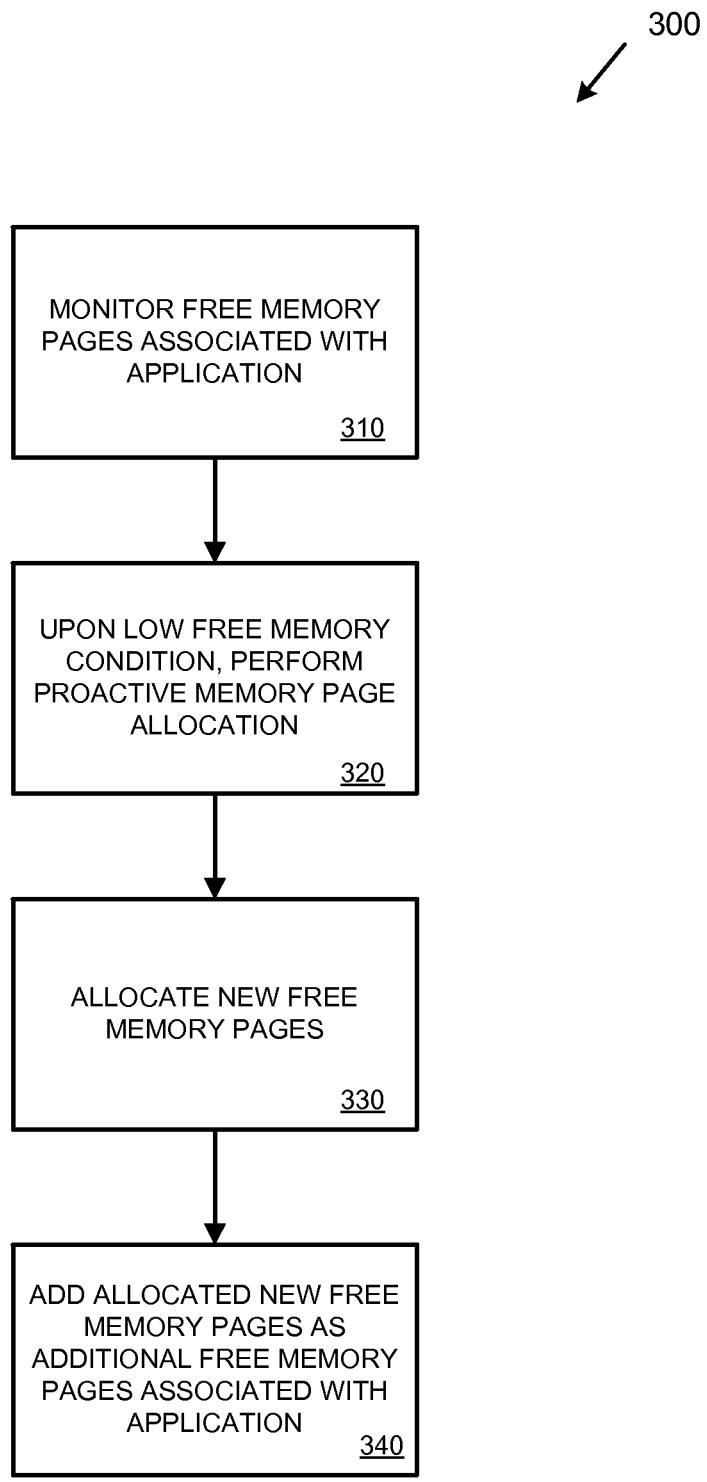
FIG. 3 is a flowchart of an example method for proactive memory page allocation.

FIG. 3 is a flowchart of an example method 300 for proactive memory page allocation (e.g., within a database environment, such as an in-memory database environment). At 310, free memory pages associated with an application (e.g., a database application or another type of application) are monitored. In some implementations, the free memory pages are stored within a free memory page pool associated with the application.

At 320, when a low free memory condition is detected, proactive memory page allocation is performed. The low free memory condition can be detected during the monitoring (at 310) based on the number of free memory pages in the pool. For example, the low free memory condition can be detected when the number of free memory pages in the pool falls below a threshold value (e.g., a predetermined threshold, such as a system-defined or user-defined threshold, or a dynamic threshold). The low free memory condition can be detected, at least in part, by a thread (e.g., a dedicated thread of execution within the application) and/or by a process.

When the low free memory condition has been detected (at 320), new free memory pages are allocated (at 330) and added (at 340) as additional free memory pages associated with the application. In some implementations, the allocated new free memory pages are added (at 340) to a free memory page pool associated with the application.

In some implementations, the new free memory pages are allocated (e.g., at 330) via an operating system. For example, a thread or process of the application can use operating system calls to request the new free memory pages.

In some implementations, the monitoring (at 310) and proactive memory page allocation (at 320, 330, and 340) are performed by a dedicated thread of the application that is dedicated to performing proactive memory page allocation. Proactive memory page allocation can also be performed by other threads and/or processes of the application (e.g., in addition to the dedicated thread). For example, the dedicated thread can perform the monitoring on a scheduled basis (e.g., every few milliseconds or seconds) and perform proactive memory page allocation if a low free memory condition exists while the other threads of the application can check for a low free memory condition during when performing other operations.

In other implementations, monitoring and/or proactive memory page allocation can be performed by other threads and/or processes of the application (instead of using a dedicated thread).

In some implementations, free memory pages available within an application are utilized by a process running the application (a computer process that is an instance of the application being executed on a computing device). The process can be executed by one or more threads of execution. In some implementations, a plurality of threads of execution are utilized, where the plurality of threads comprise one or more threads that perform operations related to the application (e.g., for a database application, the operations can include database-related operations) and another thread that is dedicated to performing monitoring and proactive memory page allocation.

In an example implementation, the application is an in-memory database application that performs, at least in part, database operations related to a row store (e.g., a structure that stores database table information organized by rows). In the example implementation, free memory pages are used when additional memory is needed for the row store (e.g., when adding data to the row store, such as adding new rows to a database table). In the example implementation, the database application can perform database operations (e.g., performed by one or more threads) comprising insertion operations for inserting data to the row store, update operations for updating data within the row store, and delete operations for deleting data from the row store. Proactive memory page allocation can be performed by a dedicated thread (e.g., dedicated to performing monitoring and proactive memory page allocation) and/or by other threads (e.g., by the threads performing the database operations).

Figure 4:
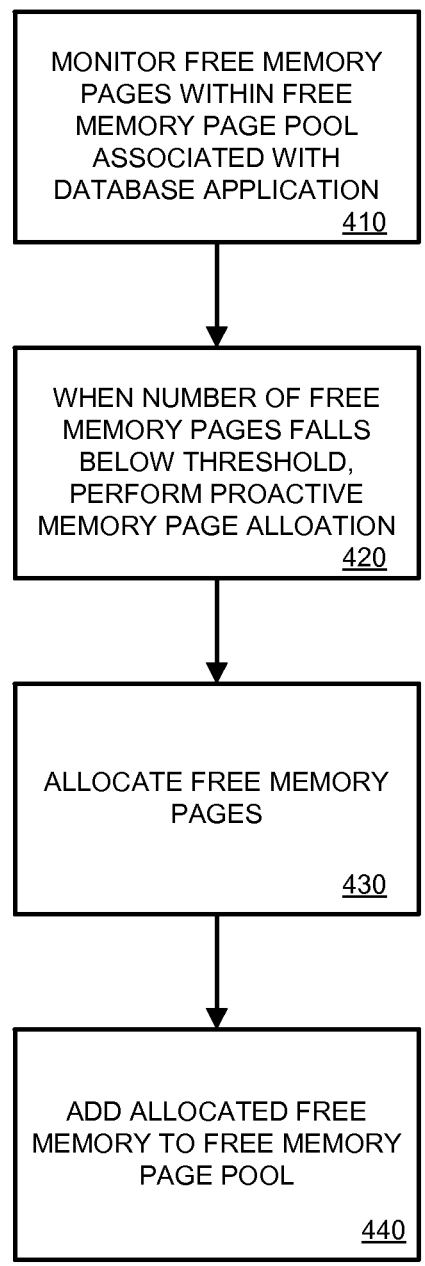
FIG. 4 is a flowchart of an example method for proactive memory page allocation within a database environment.

FIG. 4 is a flowchart of an example method 400 for proactive memory page allocation within a database environment. At 410, free memory pages associated with a database application are monitored during runtime of the database application. The free memory pages associated with the database application are stored within a free memory page pool associated with the database application.

At 420 when a number of free memory pages in the free memory page pool falls below a threshold value based on the monitoring, proactive memory page allocation is performed. The threshold value can be a predetermined system-defined or user-defined threshold, or a dynamic threshold (e.g., based on measured and/or predicted workload of the database application, such as an amount of data expected to be inserted into a row store). In a particular example, the threshold value is set to 10,000 free memory pages having a 16 KB page size. Other implementations can use a different threshold value and/or page size.

When the number of free memory pages falls below the threshold value (as determined at 420), new free memory pages are allocated at 430. The newly allocated free memory pages are then added, at 440, to the free memory page pool. Allocating new free memory pages and adding them to the free memory page pool (430 and 440) is performed such that the number of free memory pages in the free memory page pool reaches the threshold value (e.g., equals or exceeds the threshold value). For example, the difference between the free memory pages in the pool and the threshold value (determined at 420) can be calculated and enough pages can then be allocated and added (at 430 and 440) to make up the difference.

In some implementations, free memory pages are allocated (e.g., at 430) by requesting free memory segments from an operating system. A memory segment represents a larger amount of memory than a memory page. In an example implementation, a memory segment is 64 MB while a memory page is 16 KB. In the example implementation, when a memory segment of 64 MB is allocated via the operating system, the memory segment is divided into 4,096 memory pages, which are then added to the free memory pool. In other implementations, different size memory segments and/or memory pages are used.

In some implementations, the monitoring (at 410) and proactive memory page allocation (at 420, 430, and 440) are performed by a dedicated thread of the database application that is dedicated to performing proactive memory page allocation. Proactive memory page allocation can also be performed by other threads and/or processes of the database application (e.g., in addition to the dedicated thread). For example, the dedicated thread can perform the monitoring on a scheduled basis (e.g., every 100 milliseconds) and perform proactive memory page allocation if a low free memory condition exists while the other threads of the database application can check for a low free memory condition when performing other operations (e.g., database-related operations, such as query operations, data insertion, update, or delete operations, etc.).

Figure 5:
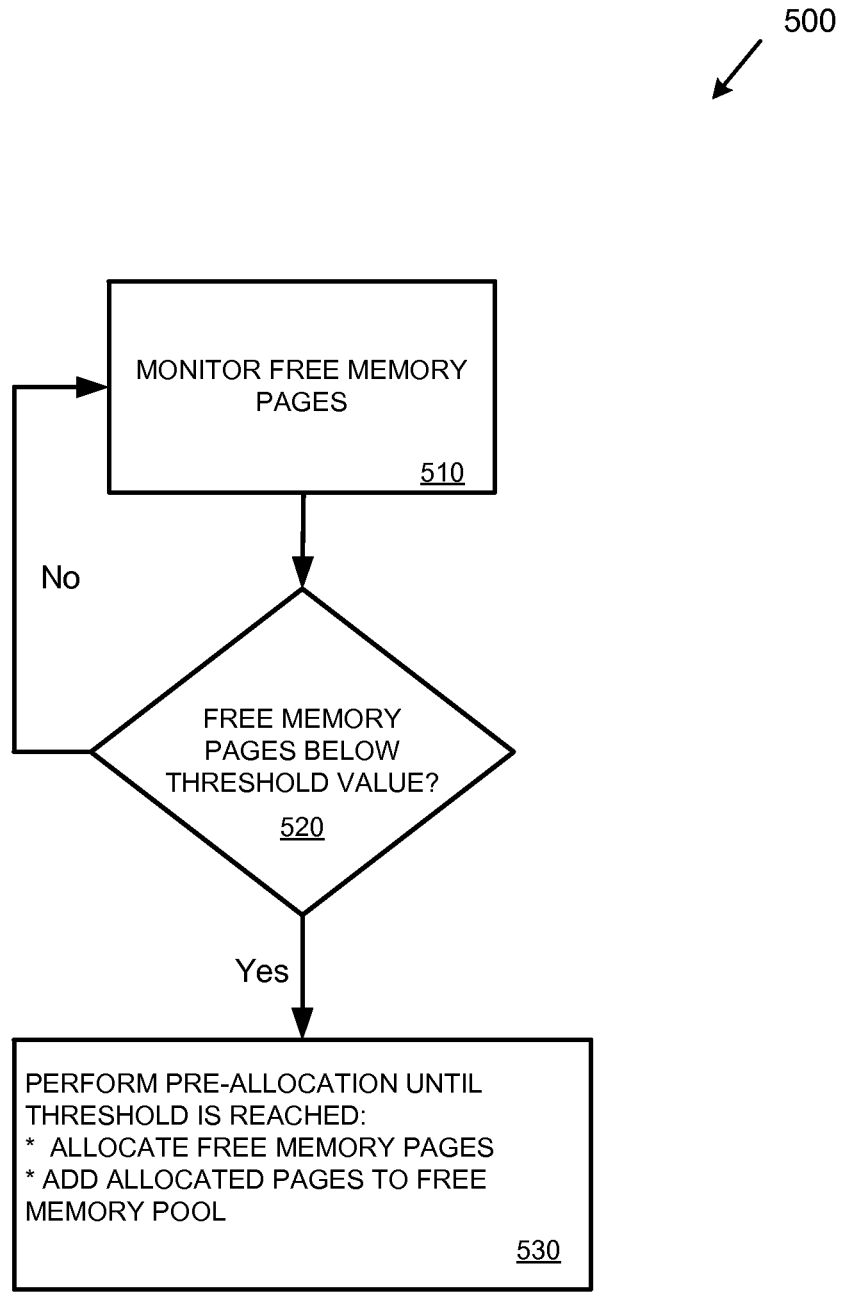
FIG. 5 is a flowchart of an example method for pre-allocating memory pages.

FIG. 5 is a flowchart of an example method 500 for pre-allocating memory pages. At 510, free memory pages are monitored. For example, a thread or another type of process or application in a computing environment (e.g., a pre-allocation thread) can monitor the number of free memory pages in a free memory page pool.

At 520, a check is made to determine whether the number of free memory pages in the free memory page pool has fallen below a threshold value (e.g., a pre-determined or user-configured threshold value). If the number of free memory pages has fallen below the threshold value, the method proceeds to 530. Otherwise, monitoring continues at 510.

At 530, pre-allocation is performed. Pre-allocation comprises allocating free memory pages and adding the allocated pages to the free memory pool. Pre-allocation continues until the number of free memory pages in the free memory pool reaches the threshold value (e.g., equals and/or exceeds the threshold value).

In an example implementation, a database environment can be provided comprising one or more computer servers operating one or more databases. The database environment can be configured to perform operations for per-allocating memory pages using one or more of the technologies described herein.

Example 4—Algorithm

In any of the examples herein, algorithms can be provided to pre-allocate pages in a database environment (e.g., to perform proactive memory page allocation). In some implementations, the following algorithm is used to perform the pre-allocation of pages.
1. At database management system (DBMS) startup time, a pre-allocation thread (T) (e.g., dedicated thread 120 or 220) is created and periodically monitors the current size of set of the free pages (e.g., the number of free memory pages in free memory page pool 130 or 230).
   a. If the number of free pages is smaller than the predetermined threshold value, the thread allocates pages in advance and adds them into the free page set.
   b. The thread T stops pre-allocation if the number of free pages is equal to the predetermined threshold value.
2. Upon data insertion, each user-request-serving thread (U) (e.g., processing threads 110 or 210) also checks the current number of free pages.
   a. If it's smaller than the predetermined threshold value, it triggers asynchronous pre-allocation by notifying thread T to indicate that pre-allocation is needed.
   b. The pre-allocation is then performed by thread T upon receiving notification from the user-request-serving thread U.
      i. Thread T pre-allocates new pages and adds them into free page set.
   c. The thread T stops pre-allocation if the number of free pages is equal to the predetermined threshold value.

Example 5—Runtime Environment

In any of the examples herein, a runtime environment can be provided supporting proactive memory allocation. The runtime environment can comprise one or more computer processes that implement an application (e.g., a database application or another type of application).

Figure 6:
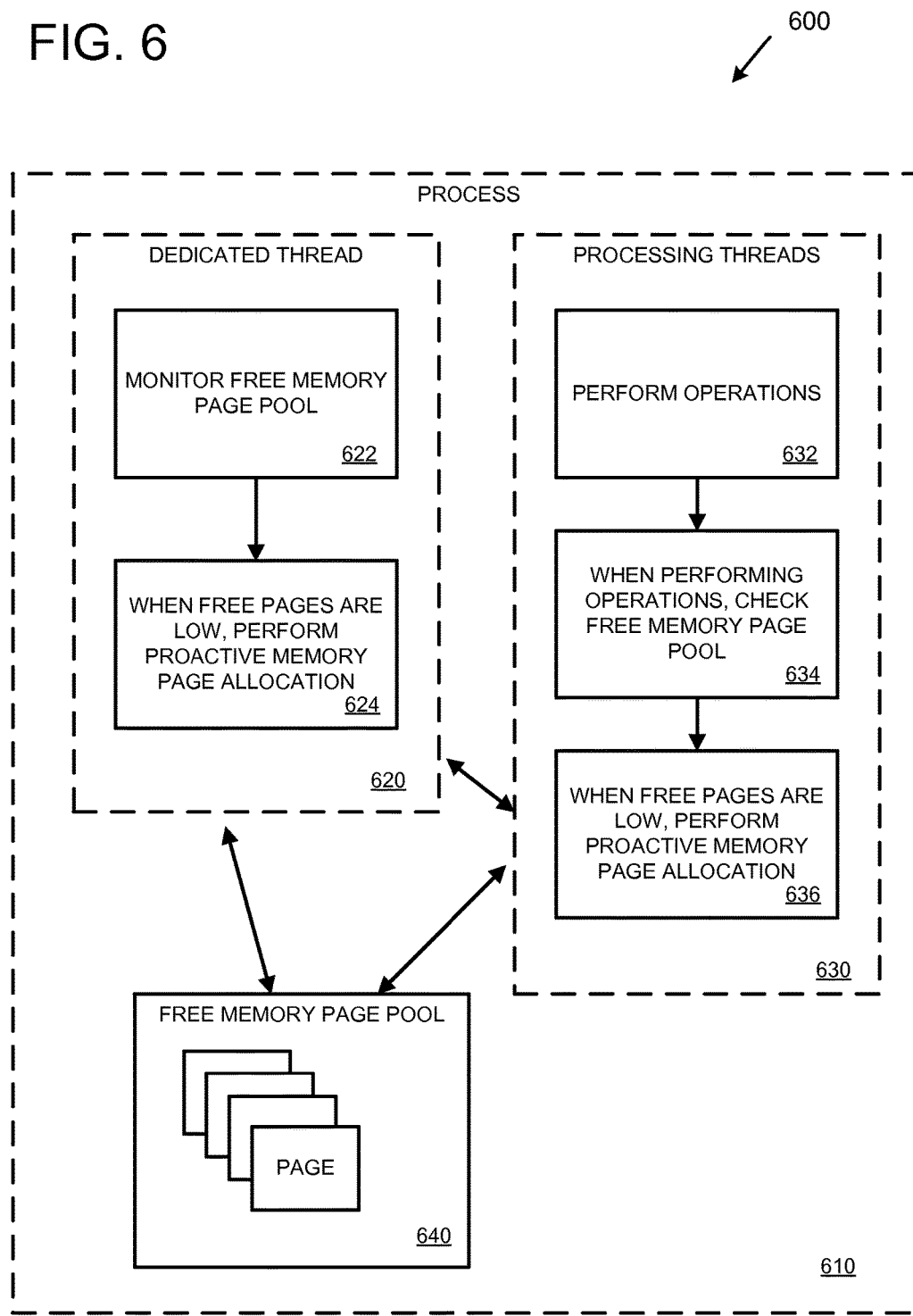
FIG. 6 is a diagram of an example environment supporting proactive memory page allocation within a runtime process of an application.

FIG. 6 is a diagram of an example environment 600 supporting proactive memory page allocation within a runtime process 610 of an application. The runtime process 610 is associated with a free memory page pool 640 that stores free memory pages for use by the threads of the runtime process 610. For example, when a free memory page is needed by the threads of the runtime process 610, it can be obtained from the free memory page pool 640.

As depicted in the example environment 600, the runtime process 610 includes a dedicated thread 620. The dedicated thread is dedicated to performing proactive memory page allocation by monitoring (as depicted at 622) the free memory page pool 640. When the number of free memory pages in the free memory page pool 640 is low, the dedicated thread 620 performs proactive memory page allocation (as depicted at 624). When performing proactive memory page allocation, the dedicated thread 620 can obtain new free memory pages from the operating system and add them to the free memory page pool 640.

The runtime process 610 also includes processing threads 630 that perform operations supporting the application (as depicted at 632). In some implementations, the processing threads 630 also participate in proactive memory page allocation. For example, when the processing threads 630 are performing operations, the processing threads 630 can also check the free memory page pool 640 (as depicted at 634). If the number of free memory pages in the free memory page pool 640 is low, the processing threads 630 can notify the dedicated thread 620 to allocate new free memory pages. Alternatively, the processing threads 630 can perform proactive memory page allocation (as depicted at 636) instead of notifying the dedicated thread 620 to perform the proactive memory page allocation.

Example 6—Computing Systems

Figure 7:
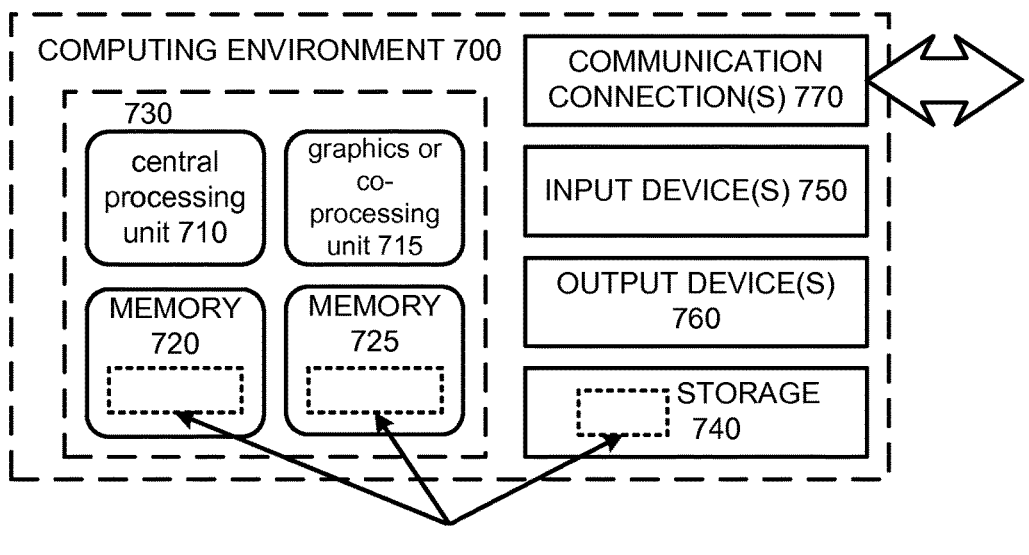
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Cloud Computing Environment

Figure 8:
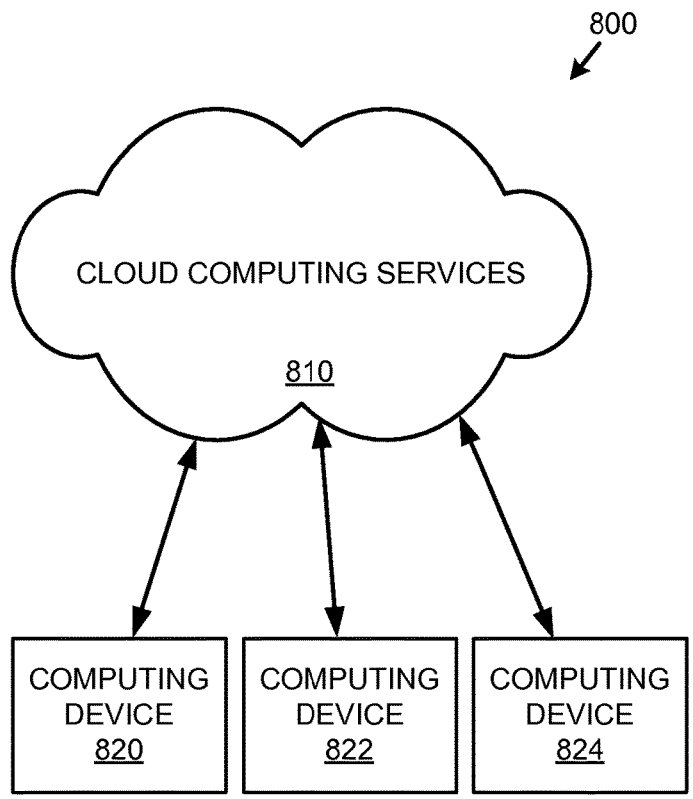
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example 8—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device, for proactive memory page allocation, the method comprising:
   by one or more application processing threads of a computer process running a database application:
      performing insertion, update, and deletion operations of the database application;
   by a dedicated thread of the computer process that only performs monitoring and proactive memory page allocation and does not perform the insertion, update, and deletion operations of the database application:
      monitoring, during runtime, free memory pages available within the database application and utilized by the computer process; and
      based on the monitoring, when a number of the free memory pages within the database application is below a threshold value and indicates a low free memory condition, performing proactive memory page allocation comprising:
         allocating one or more new free memory pages in advance of the new free memory pages being needed by any of the application processing threads; and
         adding the allocated one or more new free memory pages as additional free memory pages available for use by the database application; and
      based on the monitoring, and responsive to the number of the free memory pages equalling the threshold value, stopping the proactive memory page allocation;
   wherein the free memory pages and the new free memory pages are stored in random-access memory (RAM) of the computing device;
   wherein the dedicated thread is independent of the one or more application processing threads; and
   wherein the proactive memory page allocation is performed during the performance of the insertion, update, and deletion operations of the database application.

2. The method of claim 1 wherein the free memory pages available within the database application are stored in a free memory page pool associated with the database application.

3. The method of claim 1 wherein allocating the one or more new free memory pages comprises:
   obtaining, by the database application, the one or more new free memory pages from an operating system of the computing device.

4. The method of claim 1 wherein the database application is an in-memory database application that performs, at least in part, the insertion, update, and deletion operations on a row store, and wherein the free memory pages available within the application are used when additional memory is needed for the row store.

5. A non-transitory computer-readable storage medium storing computer-executable instructions for causing a computing device to perform a method for proactive memory page allocation, the method comprising:
   by a dedicated thread whose entire workload consists of monitoring and proactive memory page allocation, the dedicated thread being part of a computer process running a database application, wherein the dedicated thread does not perform insertion, update, and deletion operations of the database application:
      monitoring, during runtime, free memory pages available within the database application for utilization by the computer process; and
      based on the monitoring, when a number of the free memory pages within the database application is below a threshold value and indicates a low free memory condition, performing proactive memory page allocation comprising:
         allocating one or more new free memory pages from an operating system in advance of the new free memory pages being needed; and
         adding the allocated one or more new free memory pages as additional free memory pages available for use by the database application;
      wherein the free memory pages and the new free memory pages are stored as a free memory page pool in random-access memory (RAM) of the computing device; and
   by one or more application processing threads of the computer process:
      performing the insertion, update, and deletion operations of the database application; and
      obtaining a free memory page from the free memory page pool when additional memory is needed; and
      wherein the proactive memory page allocation is performed during the performance of the insertion, update, and deletion operations of the database application;
      whereby the application processing threads obtain additional memory without a delay for memory allocation from the operating system.

6. The method of claim 1, wherein the dedicated thread is created at startup of the application.

7. The non-transitory computer-readable storage medium of claim 5, wherein the dedicated thread is independent of the application processing threads.

8. A computing device comprising:
   a hardware processor; and
   random-access memory (RAM);
   the computing device configured to perform operations for proactive memory page allocation, the operations comprising:
      by one or more application processing threads of a computer process running a database application:
         performing insertion, update, and deletion operations of the database application;

by a dedicated thread of the computer process that only performs monitoring and proactive memory page allocation and does not perform the insertion, update, and deletion operations of the database application:

monitoring, during runtime, free memory pages available within the database application and utilized by the computer process; and based on the monitoring, when a number of the free memory pages within the database application is below a threshold value and indicates a low free memory condition, performing proactive memory page allocation comprising:

allocating one or more new free memory pages in advance of the new free memory pages being needed by any of the application processing threads; and adding the allocated one or more new free memory pages as additional free memory pages available for use by the database application; and based on the monitoring, and responsive to the number of the free memory pages equalling the threshold value, stopping the proactive memory page allocation;

wherein the free memory pages and the new free memory pages are stored in random-access memory (RAM) of the computing device;

wherein the dedicated thread is independent of the one or more application processing threads; and wherein the proactive memory page allocation is performed during the performance of the insertion, update, and deletion operations of the database application.

9. The computing device of claim 8 wherein the free memory pages available within the database application are stored in a free memory page pool associated with the database application.

10. The computing device of claim 8 wherein allocating the one or more new free memory pages comprises:

obtaining, by the database application, the one or more new free memory pages from an operating system of the computing device.

11. The computing device of claim 8 wherein the database application is an in-memory database application that performs, at least in part, the insertion, update, and deletion operations on a row store, and wherein the free memory pages available within the application are used when additional memory is needed for the row store.

\* \* \* \* \*